__US006035219A__

United States Patent [19]
Brodie

[11] Patent Number: 6,035,219
[45] Date of Patent: Mar. 7, 2000

[54] FREQUENCY ASSIGNMENT AMONG ANTENNAS IN A CELLULAR COMMUNICATIONS NETWORK

[75] Inventor: Iain Richard Brodie, Waterbeach, United Kingdom

[73] Assignee: Ionica International Limited, United Kingdom

[21] Appl. No.: 08/945,599

[22] PCT Filed: Apr. 19, 1996

[86] PCT No.: PCT/GB96/00950

§ 371 Date: Oct. 28, 1997

§ 102(e) Date: Oct. 28, 1997

[87] PCT Pub. No.: WO96/34505

PCT Pub. Date: Oct. 31, 1996

[30] Foreign Application Priority Data

Apr. 28, 1995 [GB] United Kingdom .................... 9508639

[51] Int. Cl.[7] ..................................................... H04Q 7/20
[52] U.S. Cl. ........................ 455/562; 455/447; 455/561
[58] Field of Search .................................. 455/447, 524, 455/562, 561, 446, 448, 449, 429

[56] References Cited

U.S. PATENT DOCUMENTS

| 5,247,699 | 9/1993 | Hartman | 455/447 |
| 5,483,667 | 1/1996 | Faruque | 455/33.1 |
| 5,537,682 | 7/1996 | Miller | 455/562 |
| 5,551,060 | 8/1996 | Fujii et al. | 455/562 |
| 5,576,717 | 11/1996 | Searle et al. | 455/562 |
| 5,742,911 | 4/1998 | Dumbrill et al. | 455/562 |
| 5,873,048 | 2/1999 | Yun | 455/562 |
| 5,901,356 | 5/1999 | Hudson | 455/451 |

FOREIGN PATENT DOCUMENTS

| 0 435 283 A1 | 7/1991 | European Pat. Off. | H04B 7/26 |
| 43 18495 A1 | 12/1994 | Germany | H04B 7/26 |
| 61-71643 | 5/1986 | Japan . | |
| 2-84857 | 7/1990 | Japan . | |
| 3-255241 | 11/1991 | Japan . | |
| 5-125743 | 5/1993 | Japan . | |
| 6-220888 | 8/1994 | Japan . | |
| 7-11664 | 1/1995 | Japan . | |
| 7-243223 | 9/1995 | Japan . | |

OTHER PUBLICATIONS

Jan–Erik Stjernvall, Ericsson Radio Systems AB, "Calculation of Capacity and Co–Channel Interference In A Cellular System", Feb. 5–7 1985, Espoo, Finland.

*Primary Examiner*—Edward F. Urban
*Assistant Examiner*—Tilahun Gesesse
*Attorney, Agent, or Firm*—Fish & Richardson P.C.

[57] ABSTRACT

A cellular telecommunications network includes spaced apart base stations. Each base station has three directional antennas for transmission and reception of signals to subscriber units. Eight frequency groups are assigned among all the antennas such that each frequency group is reused on average at three out of every eight base stations.

27 Claims, 4 Drawing Sheets

INTERFERENCE SCENARIOS

CALL REPEAT PATTERN WITH POLARISATION

FREQUENCY ASSIGNMENT AMONG ANTENNAS IN A CELLULAR COMMUNICATIONS NETWORK

This is a continuation of International Patent Application No. PCT/GB96/00950, with an International Filing Date of Apr. 19, 1996.

The present invention relates to a method of assigning carrier frequencies to base stations in a cellular radio telecommunications network, and to a radio telecommunications network including such frequency assignments.

In known cellular radio systems, such as for mobile telephones, a network of base stations are provided each having antennas. Mobile subscriber units have antennas which are necessarily omni-directional as subscribers often move around, both within cells and from one cell to another. In consequence, a seven-cell frequency reuse pattern is common, as described, for example, in Cellular Radio Systems, Balston D M Macario RCV Editors, Artech House Inc, 1993, page 9 to 13.

The invention is defined in the claims to which reference should now be made. Preferred features are laid out in the dependent claims.

The present invention preferably provides a cellular telecommunications network including spaced apart base stations, each base station comprising three directional antennas for transmission and reception of signals to subscriber units, eight frequency groups being assigned among the antennas such that each frequency group is reused on average at three out of every eight base stations.

The azimuthal look directions of the three antennas of a base station are preferably substantially 120° from each other. The base stations are preferably spaced so as to be equidistant from its six nearest neighboring stations, and to lie in alternating parallel first and second rows such that antennas in first rows point at 0°, 120° and 240° azimuthal angles, and antennas in second rows point at 60°, 180° and 300° azimuthal angles. The azimuthal angles are preferably clockwise and with north being 0°.

A preferred base station has an antenna with a look direction using the same frequency group as an oppositely—directed look direction of an antenna of a neighboring base station in an adjacent row.

Frequency groups are preferably assigned according to any of the following rules:

(a) a frequency group is not assigned to more than one antenna at a base station, (b) the same frequency groups are assigned to corresponding antennas at every sixth base along a row, (c) the same frequency groups are assigned to corresponding antennas at every twenty-fourth base station along a column, (d) the antennas in a row having the same look direction of 0° or 180° azimuth angle are assigned alternating frequency groups along the row, and the antennas in the row having other look directions are assigned other frequency groups such that the frequency groups are not reused in adjacent antenna coverage areas. In particular, frequency groups $f_1$, $f_3$, $f_4$ are used in base stations at column i, row n; frequency groups $f_2$, $f_5$, $f_3$ are used in column i+1, row n, frequency groups $f_1$, $f_4$, $f_5$ are used in column i+2, row n.

(e) column i+2, row n+2 has frequency groups corresponding with those for column i, row n where the frequency groups are selected as $$f_{i+2,n+2} = f_{i,n\ddagger 3}$$

where f is the frequency group at a sector of the base station at column i row n, $f_{i+2, n+2}$ is the frequency group at the corresponding sector of the base station at column i row n, ‡ indicates a circular addition up to 8.

The antennas at base stations in the network are preferably 120° beamwidth directional antennas, but might be of lower beamwidth, such as 60 to 85°.

The network can comprise a selection of base stations configured and having frequency groups assigned so as to avoid selected poor communication paths, specifically those having high co-channel interference. To avoid selected poor communication paths, alternate rows of base stations in the network can substantially use alternate signal polarisations. Selected base stations can have polarisations different to other members of their row so as to avoid selected poor communication paths.

The present invention is preferably for use with subscriber units having directional antennas. Preferably the direction(s) and location(s) of the or each antenna of a subscriber unit are fixed.

The present invention also relates to corresponding methods of frequency group assignment.

A frequency group can be a frequency, a range of frequencies or a selection of frequencies.

A preferred embodiment of the present invention will now be described by way of example and with reference to the drawings in which.

FREQUENCY ASSIGNMENT IN THE BASE STATION NETWORK

Figure 1:
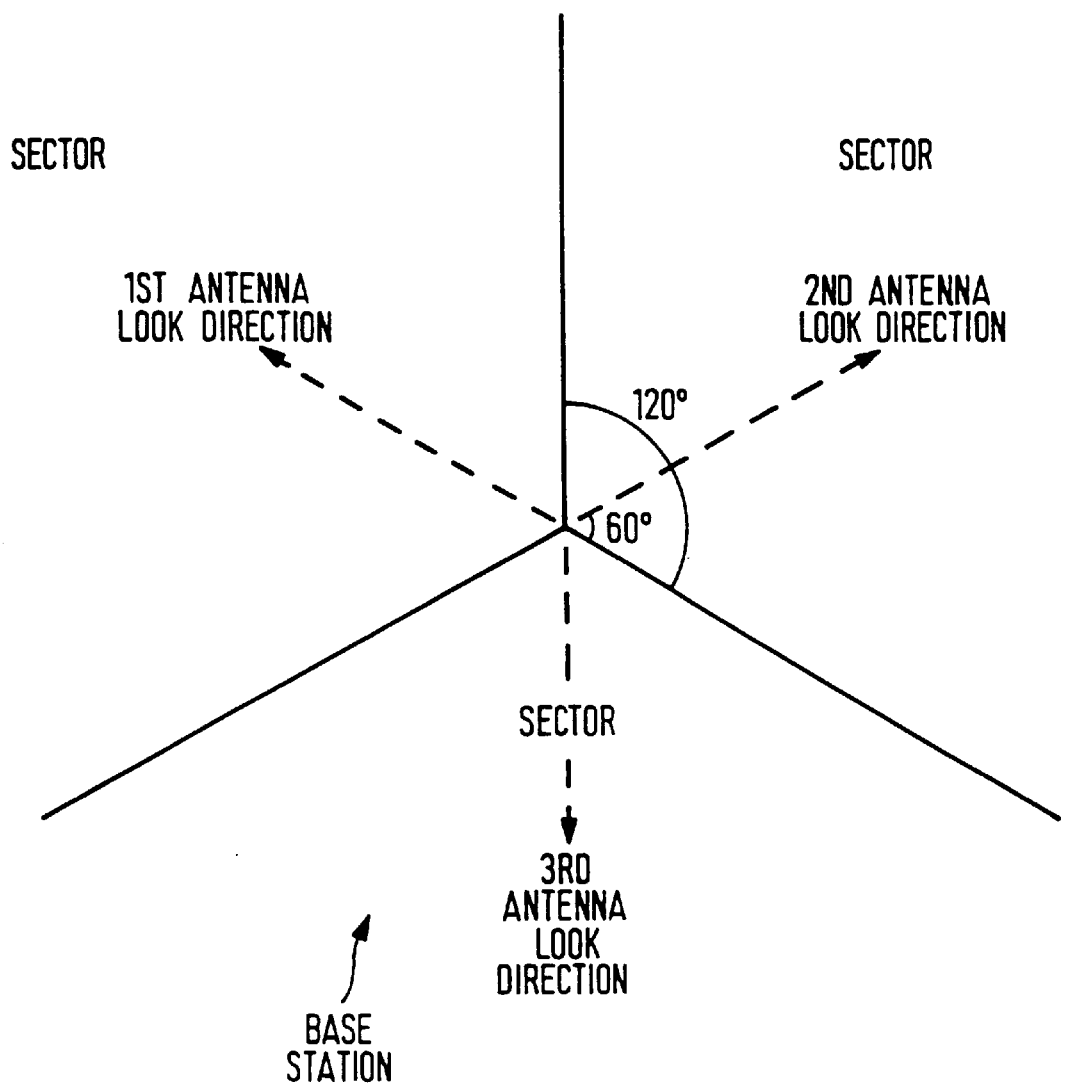
FIG. 1 illustrates a single base station with three antennas.
Figure 2:
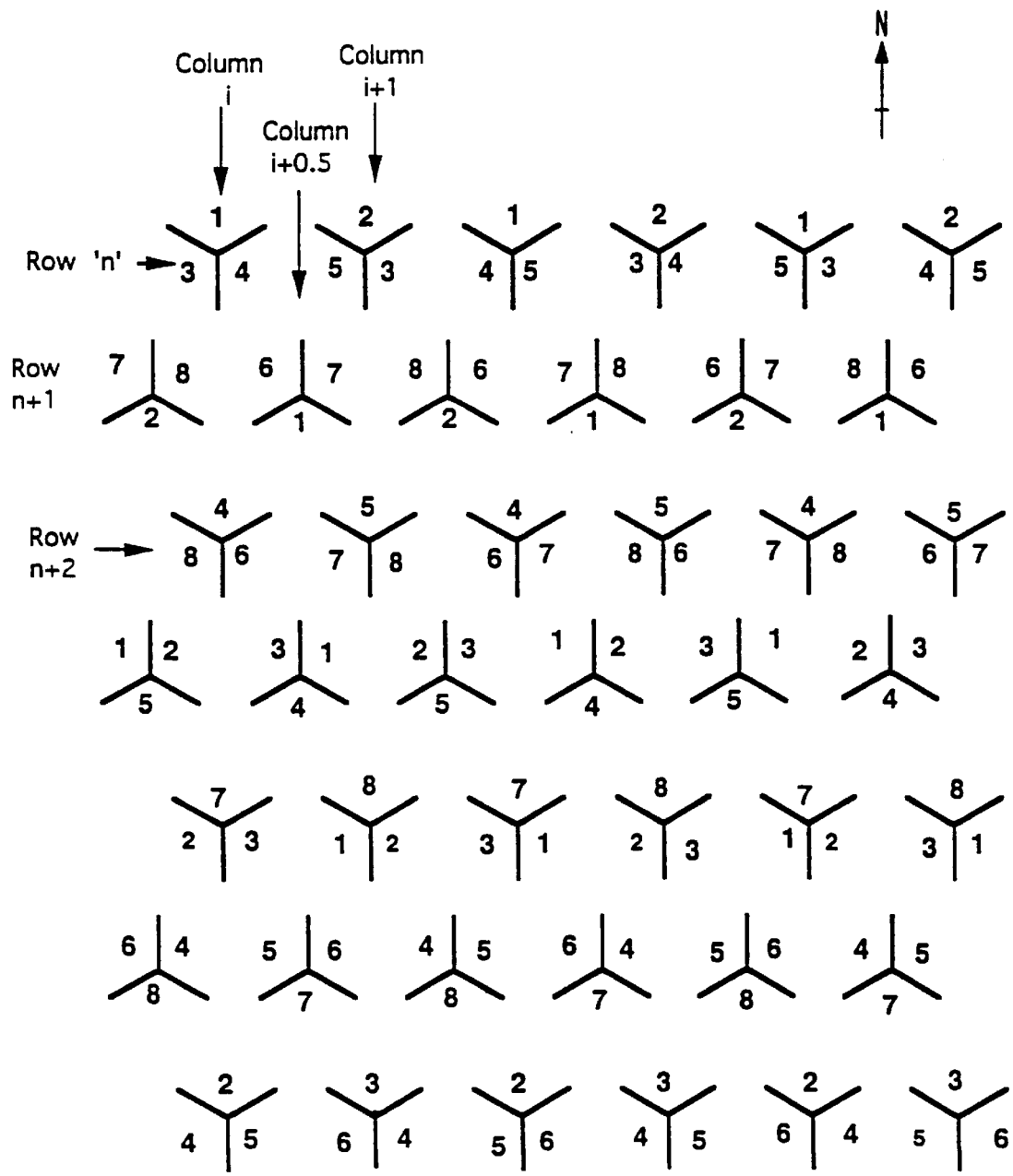
FIG. 2 illustrates the allocation of frequency bands within the base station network.

As shown schematically in FIG. 1, a base station has three directional antennas, each directed 120° apart in the horizontal plane such that the cell or base site of each base station is divided into three sectors. A network of these base stations is shown in FIG. 2. In this network, the base stations are distributed such that each base station is equidistant from its nearest six neighbours. Considering the base stations are lying in rows which are shown horizontally in FIG. 2, each base station has a neighbour on either side in the same row and two neighbours on each of the adjacent rows.

It will be seen from FIG. 2 that the antennas on alternate rows are aligned differently. For example, the antenna look directions for antennas at base stations on rows n, n+2, n+4. . . n+2i point North (0°), 120° and 240°. The antennas at base stations on rows n+1, n+3. . . n+(2i−1) point at 60°, 180° and 300°. The base stations on rows n+1, n+3, are offset in an east-west direction by half the separation between base stations on a row.

Eight frequency groups are used and these are assigned as follows:

(i) On every row, the same frequency groups are assigned at the corresponding antennas at every sixth base station, ($i_{bs}$=1, 7, 13, 19 etc).

(ii) On every column, running north-south, the same frequency groups are assigned at the corresponding antennas at every twenty-fourth base station, ($i_{bs}$=1, 25, 49, 73 etc).

(iii) The north facing sectors of base stations in row n are alternately assigned frequency groups denoted 1 and 2 Frequency group numbers are labels for frequency groups, neighboring numbers, eg. 1 and 2, can, but need not be, adjacent frequencies in a frequency range. The other sectors of the base stations on this row use frequency groups denoted 3, 4 and 5 assigned such that a particular frequency group is not used for more than one antenna at a base station nor in both of two neighbouring base station sectors.

As shown in FIG. 2, the base station at column i (row n) uses frequency groups 1,3,4; the station at column i+1 (row n) uses frequency groups 2,5,3; the base station at column i+2 (row n) uses frequencies 1,4,5; and so on.

As shown in FIG. 2, each base station and a neighbouring base station in an adjacent row have antennas with oppositely—directed look directions using the same frequency group.

The base stations along row n+1 has frequency groups 1 and 2 alternately assigned to the south facing antennas and two frequency groups selected from groups 6,7 and 8 on their other antennas such that a particular frequency group is not used for more than one antenna at a base station nor in both of two neighbouring base station sectors.

The base stations in column i+2, row n+2 are configured to correspond to those allocated for column i, row n where the frequency groups are selected as $$f_{i+2,n+2} = f_{i,n} \ddagger 3$$

where f is the frequency group at a sector or the base station at column i row n, $f_{i+2, n+2}$ is the frequency group at the corresponding sector of the base station at column i row n, ‡ indicates a circular addition up to 8, i.e. 8‡1=1
7‡3=2
2‡3=5.

Thus if a frequency group f is allocated to an antenna having a bearing of 60° at a base station in row n+1 column i+0.5, frequency group f is also assigned to the antenna with a 240° bearing at a base station in row n+2 column i+1. Also, if a frequency group f is allocated to an antenna having a bearing of 300° at a base station in row n+1 column i+0.5, frequency group f is also assigned to the antenna with a 120° bearing at a base station in row n+2 column i-1.

Signal to Interference Analysis on the Preferred Network

Figure 3:
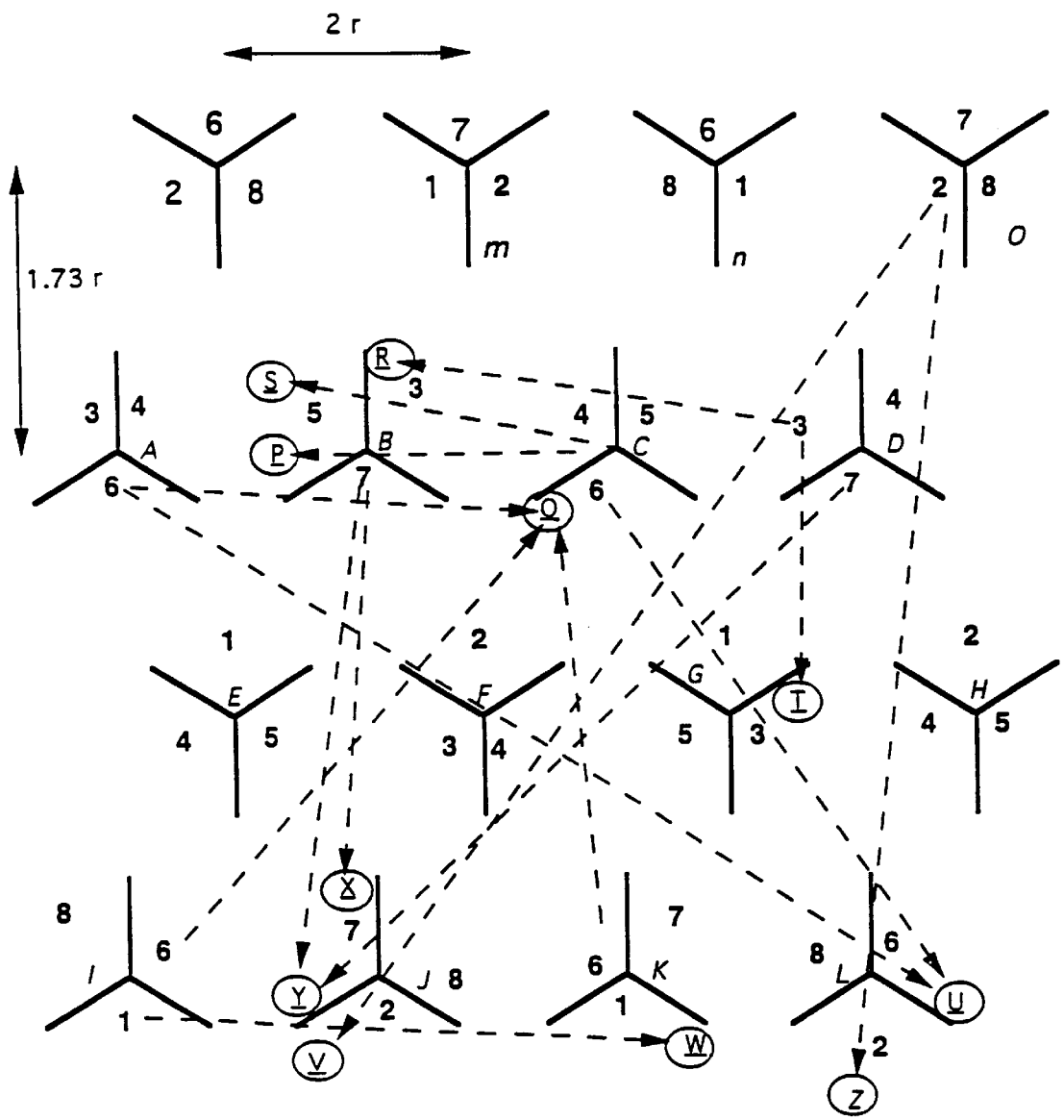
FIG. 3 illustrates some selected signal paths for which signal to noise ratios are determined.

To consider the signal to interference ratios possible in the base station network, a simple analysis has been undertaken to determine signal to interference ratios at likely "worst case" locations. FIG. 3 shows a subset of the base station network which is shown in FIG. 2 in which particular bas stations A to O are identified. Circled points which are denoted P to Z indicate where poor reception, i.e. low signal to noise ratios, are expected. The frequency group used in the various sectors are shown in FIG. 3. The broken lines shown in FIG. 3 indicate signal transmission paths selected for determination of signal to noise ratios.

Signal to interference ratio calculations were made assuming realistic signal strength values and that the signal strength decreases as a function of distance cubed, i.e. $d^3$ where d is distance. The antennas at the base stations were taken as having a beam width of 120° and a front-to-back ratio, ie. maximum attenuation due to antenna directionality of 18 dB. The fixed subscriber unit antennas were assumed to be highly directional having a beam width of 10° and a front-to-back ratio of 20 dB. The points P to Z were set to lie at the edge of the sector in which they are located and at a distance r from the nearest antenna where the separation of antennas is at least 2 r. The base station serving the sector in which a point P to Z is located is denoted the server. An interfering base station is an "interferer".

TABLE 1

Losses from Server at Sampled Points.

| Point | Serving Base | Frequency Group | Angle offset at base station/° | Loss at base station/dB |
|---|---|---|---|---|
| P | B | 5 | 30 | 1 |
| Q | C | 6 | 60 | 3 |
| R | B | 3 | 60 | 3 |
| S | B | 5 | 0 | 0 |
| T | G | 3 | 60 | 3 |
| U | L | 6 | 60 | 3 |
| V | J | 2 | 25 | 1 |
| W | K | 1 | 60 | 3 |
| X | J | 7 | 60 | 3 |
| Y | J | 7 | 60 | 3 |
| Z | L | 2 | 10 | 0 |

The server and the frequency group for each of the points P to Z is shown in Table 1. The azimuthal offset angle between the direction to the point P to Z and the look direction of its serving antenna is also indicated together with the corresponding azimuthal loss at the serving antenna.

In determining signal to interference ratios, the effect of interfering bases on the signals are determined, assuming all transmitters are of the same power. The paths to points P to Z and, in each case, the neighbouring base which uses the same frequency groups and so interferes are shown as the first two columns of Table 2. The frequency groups are shown in the third column, and the path distances which interfering signals must travel relative to the corresponding path distances for desired signals are shown in the fourth column of Table 2.

TABLE 2

Interference and C/I in poorest locations

| Path to point | Interfering Base | Freq. | Distance ratio-(r) | Angle offset (base) | Angle offset (subsc unit) | Loss base, /dB | Loss (sub) /dB | Signal to interference /dB |
|---|---|---|---|---|---|---|---|---|
| P | C | 5 | 3 | 150 | 0 | 18 | 0 | 31 |
| Q | K | 6 | 2.6 | 50 | 110 | 2 | 20 | 31 |
| Q | A | 6 | 3.1 | 71 | 48 | 5 | 20 | 36 |
| Q | I | 6 | 4.0 | 15 | 165 | 0 | 20 | 35 |
| R | D | 3 | 4.1 | 16 | 74 | 0 | 20 | 35 |
| S | G | 5 | 4.77 | 60 | 0 | 3 | 0 | 23* |
| T | D | 3 | 1 | 150 | 120 | 18 | 20 | 35 |
| U | A | 6 | 8.1 | 60 | 0 | 3 | 0 | 27* |
| U | C | 6 | 5.1 | 35 | 24 | 20 | 1 | 39 |
| V | O | 2 | 7.2 | 35 | 0 | 1 | 0 | 25* |
| W | 1 | 1 | 5.07 | 80 | 10 | 7 | 3 | 28* |
| X | B | 7 | 2.6 | 0 | 180 | 0 | 20 | 29 |
| Y | B | 7 | 4.3 | 13 | 47 | 1 | 20 | 36 |
| Y | D | 7 | 6.5 | 50 | 10 | 2 | 3 | 26* |
| Z | O | 2 | 6.0 | 51 | 0 | 2 | 0 | 25* |

The fifth column shows the offset angles between the look directions of the antennas intended to communicate with points P to Z and the direction from which the interfering signal of the same frequency group originates.

The sixth column shows the angular offset between the interfering signal and a subscriber unit at the respective point. Each subscriber unit has a directional antenna pointing directly towards its serving antenna.

The losses due to the angular offsets are shown in the seventh and eighth columns. These predicted attenuations are more severe than is likely actually to occur in practice.

The signal to interference values evaluated are shown in the last column of Table 2, from which it can be seen that the location with the worst signal to noise ratio is point 5 which has a signal to interference ratio of 23 dB. Other poor locations are points U,Y,W,V, and Z. These points are indicated with asterisks in Table 2.

Ways to Improve Communications in the Preferred Network

The signal to interference ratios can be improved by selecting different antenna beamwidths at base stations and/or by making use of signal polarisation. These are considered in turn below.

Antenna Beamwidths

Instead of using antennas with a beamwidth of 120°, 60° beamwidth antennas can be used. Taking the attenuation at an angular offset of 60° from the antenna look direction as 12 dB, the signal to noise ratio in the worst case would be only 32 dB.

As using three 60° antennas at each base station might leave gaps in the area covered, antennas could be used having a sensitivity at 60° angular offset which is approximately the same as an omnidirectional antenna. The worst case signal to interference ratio could be improved by around 3 dB using 85° antennas without affecting coverage.

Polarisation

Figure 4:
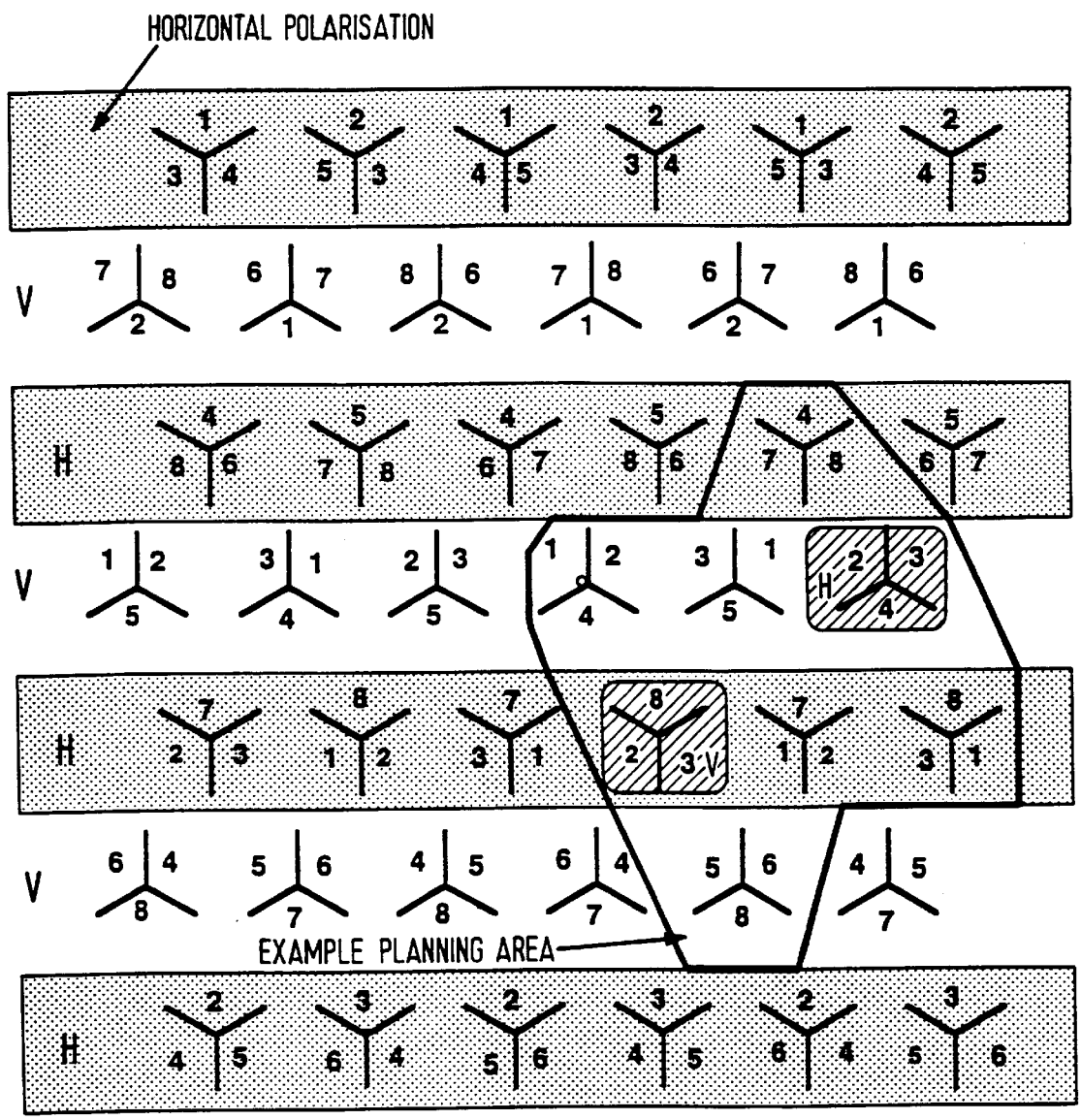
FIG. 4 illustrates the base station network modified such that alternate rows of base stations transmit and receive different polarisation.

An alternative method to increase signal to interference ratio is to use cross polarisation. As shown in FIG. 4, alternate rows are given alternately horizontal and vertical polarisations. Horizontal polarisation areas are shown shaded. This reduces interference along paths to points corresponding to S V Z as shown in FIG. 3 by about 10 dB because the worst interferer uses signals cross-polarised to those of the server. The interference to points W and Y is not changed as the server and interferer use the same polarisation.

In setting up base station networks in restricted areas, particular poor signal to interference paths can be avoided. For example, if a long narrow area is to be covered, two rows of base stations could be used, the polarity being alternated along each row. The poor signal to interference ratio along paths corresponding to points V and Z would not arise as these are caused by bases 3 rows distant. Scenarios S, W and Y would be avoided because of the attenuating polarisation.

Another example is where the area is covered is relatively small such that few base stations are required. By selecting up to eight base stations as shown within the example planning area shown in FIG. 4, the worst signal to noise ratios are avoided by appropriate choice of polarisation and because the selected planning area avoids interferences of scenarios U and Y. As shown in FIG. 4, within the example planning area, two base stations use the alternative polarisation to the row of stations in which they lie. These two base stations are shown with diagonal line shading in FIG. 4.

By using cross polarisation, signal to interference improvements are made. The worst case ratio is about 26 dB (path to point Y), and many unacceptable paths, having say signal to interference ratios of less than 30 dB, are avoided. Many other planning areas within a larger national network besides the example shown in FIG. 4 could be selected and used on the ground so as to avoid poor communications.

I claim:

1. A cellular telecommunications network including spaced apart base stations, each of said base stations comprising three directional antennas for transmission and reception of signals to subscriber units, said network comprising eight frequency groups being assigned among the antennas such that each frequency group is reused on average at three out of every eight base stations, the base stations being spaced so as to lie in alternating parallel first and second rows such that antennas in first rows point at 0°, 120°, and 240° azimuthal angles, and antennas in second rows point at 60°, 180°, and 300° azimuthal angles.

2. A cellular telecommunications network according to claim 1, in which azimuthal look directions of the three antennas of each base station are substantially 120° from each other.

3. A cellular telecomniunications network according to claim 1, in which the base stations are spaced so as to be equidistant from its six nearest neighbouring stations.

4. A cellular telecommunications network according to claim 3, in which the azimuthal angles are clockwise and with north being 0°.

5. A cellular telecommunications network according to claim 1 in which a first base station has an antenna with a look direction using the same frequency group as an oppositely—directed look direction of an antenna of a neighbouring base station in an adjacent row.

6. A cellular telecommunications network according to claim 1 in which frequency groups are assigned according to rule that a frequency group is not assigned to more than one antenna at a base station.

7. A cellular telecommunications network according to claim 1 in which frequency groups are assigned according to the rule that the same frequency groups are assigned to corresponding antennas at every sixth base along a row.

8. A cellular telecommunications network according to claim 1 in which frequency groups are assigned according to the rule that the same frequency groups are assigned to corresponding antennas at every twenty-fourth base station along a column.

9. A cellular telecommunications network according to claim 1 in which frequency groups are assigned according to the rule that the antennas in a row having the same look direction of 0° or 180° azimuth angle are assigned alternating frequency groups along the row, and the antennas in the row having other look directions are assigned other frequency groups such that the frequency groups are not reused in adjacent antenna coverage areas.

10. A cellular telecommunications network according to claim 9, in which frequency groups $f_1$, $f_3$, $f_4$ are used in a base station at column i, row n; frequency groups $f_2$, $f_5$, $f_3$ are used in a base station at column i+1, row n, frequency groups $f_1$, $f_4$, $f_5$ are used in a base station at column i+2, row n.

11. A cellular telecommunications network according to claim 1 in which frequency groups are assigned according to the rule that a base station at column i+2, row n+2 has frequency groups corresponding with those for a base station at column i, row n where the frequency groups are selected as $$f_{i+2,n+2} = f_{i,n} \ddagger 3$$

where f is the frequency group at a sector of the base station at column i row n, fi+2, n+2 is the frequency group at the corresponding sector of the base station at colurnn i row n, and ‡ indicates a circular addition up to 8.

12. A cellular telecommunications network according to claim 1 in which the antennas at base stations in the network are 120° beamwidth directional antennas.

13. A cellular telecommunications network according to any of claims 1 in which the antennas at base stations in the network are lower than 120° beamwidth.

14. A cellular telecommunications network according to claim 13, in which the antennas are of a beamwidth in the range 60° to 85°.

15. A cellular telecommunications network according to claim 1, comprising a selection of base stations have frequency groups assigned so as to avoid selected poor communication paths.

16. A cellular telecommunications network according to claim 15, in which to avoid selected poor communication paths, alternate rows of base stations in the network substantially use alternate signal polarisations.

17. A cellular telecommunications network according to claim 15 in which selected base stations have polarisations different to other members of their row so as to avoid selected poor communication paths.

18. A cellular telecommunications network according to claim 1 in which the subscriber units have directional antennas.

19. A cellular telecommunications network according to claim 18, in which the direction(s) and location(s) of the or each antenna of a subscriber unit is fixed.

20. A cellular telecommunications network according to claim 1 in which a frequency group is a frequency, a range of frequencies or a selection of frequencies.

21. A method of frequency group assignment in a cellular telecommunications network including spaced apart base stations, each base station comprising three directional antennas for transmission and reception of signals to subscriber units, the base stations being spaced as to lie in alternating parallel first and second rows such that antennas in first rows point at 0°, 120°, and 240° azimuthal angles, and antennas in second rows point at 60°, 180°, and 300° azimuthal angles, whereby said network comprising eight frequency groups are assigned among the antennas such that each frequency group is reused on average at three out of every eight base stations.

22. A method of frequency group assignment according to claim 21, in which frequency groups are assigned according to the rule that a frequency group is not assigned to more than one antenna at a base station.

23. A method of frequency assignment according to claim 21, in which frequency groups are assigned according to the rule that the same frequency groups are assigned to corresponding antennas at every sixth base along a row.

24. A method of frequency assignment according to claim 21, in which frequency groups are assigned according to the rule that the same frequency groups are assigned to corresponding antennas at every twenty-fourth base station along a column.

25. A method of frequency assignment according to claim 21, in which frequency groups are assigned according to the rule that the antennas in a row having the same look direction of 0° or 180° azimuth angle are assigned alternating frequency groups along the row, and the antennas in the row having other look directions are assigned other frequency groups such that the frequency groups are not reused in adjacent antenna coverage areas.

26. A method of frequency group assignment according to claim 25, in which the frequency groups $f_1$, $f_3$, $f_4$ are used in base stations at column i, row n; frequency groups $f_2$, $f_5$, $f_3$, are used in column i+1, row n, frequency groups $f_1$, $f_4$, $f_5$, are used in column i+2, row n.

27. A method of frequency assignment according to claim 2, in which frequency groups are assigned according to the rule that a base station at column i+2, row n+2 has frequency groups corresponding with those for a base station at column i, row n where the frequency groups are selected as $$fi+2, n+2 = fi, n\ddagger 3$$

where f is the frequency group at a sector of the base station at column i row n, fi+2, n+2 is the frequency group at the corresponding sector of the base station at column i row n, ‡ indicates a circular addition up to 8.

* * * * *